(12) United States Patent
Sauder et al.

(10) Patent No.: US 7,798,080 B2
(45) Date of Patent: Sep. 21, 2010

(54) ADJUSTABLE SINGULATING BRUSH ASSEMBLY AND METHOD OF SINGULATING SEEDS

(75) Inventors: Gregg A. Sauder, Tremont, IL (US); Derek A. Sauder, Tremont, IL (US); Don L. Dunlap, Pekin, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 11/623,130

(22) Filed: Jan. 15, 2007

(65) Prior Publication Data

US 2007/0107644 A1   May 17, 2007

Related U.S. Application Data

(62) Division of application No. 10/919,158, filed on Aug. 16, 2004, now Pat. No. 7,162,963.

(51) Int. Cl.
*A01C 7/00* (2006.01)
*A01C 9/00* (2006.01)
*B67D 3/00* (2006.01)
*B67D 5/06* (2006.01)

(52) U.S. Cl. .................................. 111/185; 222/527
(58) Field of Classification Search ......... 111/177–185; 222/526–537, 372–394
See application file for complete search history.

(56) References Cited

U.S. PATENT DOCUMENTS

| | | | | |
|---|---|---|---|---|
| 4,307,822 A * | 12/1981 | Hardesty | ...... | 222/352 |
| 6,119,311 A * | 9/2000 | Lavallee | ...... | 16/436 |
| 6,301,740 B1 * | 10/2001 | Quiroz | ...... | 15/172 |
| 6,464,032 B1 * | 10/2002 | Fleytman | ...... | 180/245 |
| 7,093,548 B2 | 8/2006 | Eben et al. | | |
| 7,152,542 B2 | 12/2006 | Eben et al. | | |

* cited by examiner

*Primary Examiner*—Christopher J. Novosad
(74) *Attorney, Agent, or Firm*—Larkin Hoffman Daly & Lindgren Ltd.; Thomas J. Oppold

(57) ABSTRACT

An adjustable singulating brush assembly for a seed meter and method to improve seed singulation of a seed meter. The assembly includes a carrier and a brush selectively adjustably moveable with respect to the carrier. The method to improve seed singulation of a seed meter includes disposing a selectively adjustable moveable brush along a path of travel of the seed selection mechanism of the seed meter between the meter's seed reservoir and the seed discharge opening and selectively moving the adjustably moveable brush with respect to the path of travel of the seed selection mechanism such that the selected seeds meet the preselected brush position to affect removal of extra seeds from the seed selection mechanism so singular seeds are sequentially discharged through the seed discharge opening.

21 Claims, 4 Drawing Sheets

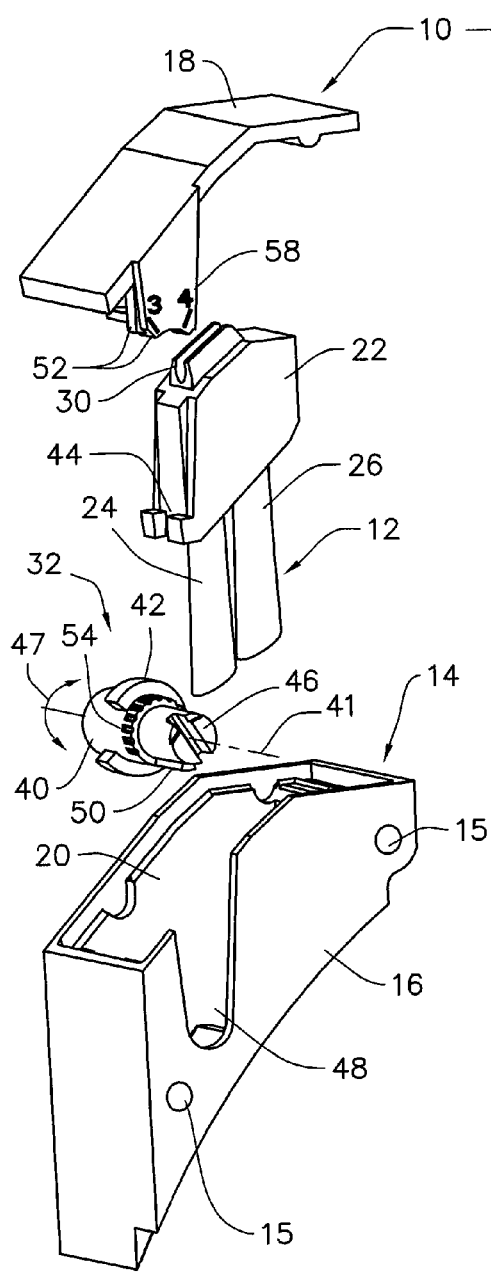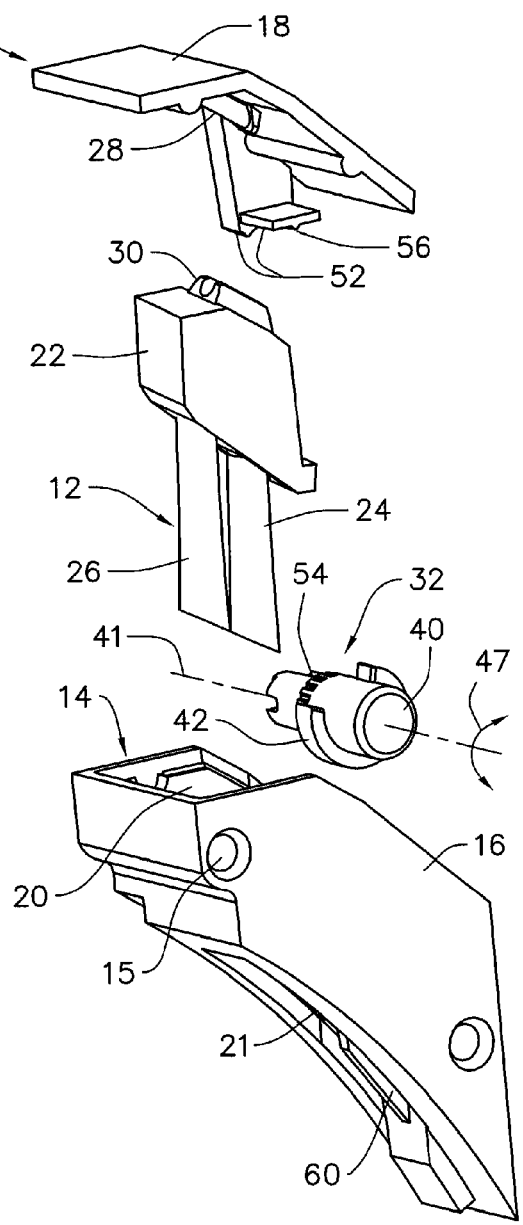
FIG. 5
FIG. 6

ADJUSTABLE SINGULATING BRUSH ASSEMBLY AND METHOD OF SINGULATING SEEDS

CROSS REFERENCE TO RELATED APPLICATIONS

This is a divisional of U.S. application Ser. No. 10/919,158 filed 16 Aug. 2004, now U.S. Pat. No. 7,162,963.

BACKGROUND OF THE INVENTION

1. Field of the Invention

The present invention is directed generally toward seed meters for agricultural planters and more particularly to singulating brushes for such seed meters.

2. Description of the Related Art

It is well recognized that proper and uniform spacing of seed in the furrow is essential to maximizing crop yield. Accordingly, virtually all commercially available seed meters are designed to singulate seeds, i.e., to dispense individuals seeds at regular intervals. Most commercially available seed meters include one or more seed singulating brushes disposed along the path of travel of the seed selection mechanism to brush or remove excess seeds from the seed selection mechanism to ensure that only singular seeds are sequentially discharged from the seed meter. The effectiveness of the singulating brush in removing excess seeds, is dependent on a number of factors, including the number of bristles that contact the seed, the length of the bristles, the stiffness of the bristles and the positioning of the bristles. Each of these four factors effecting the brush's performance can also vary depending on seed size, seed shape, seed population (which effects the speed at which the seeds contact the brush) and whether the other components of the seed meter are operating properly.

For example, if the brush is worn, not properly positioned with respect to the passing seeds (whether because of seed size, shape or rotational speed of the seed selection mechanism), or if the brush bristles are not sufficiently stiff, the brush may not sufficiently engage the passing seeds to remove any excess or extraneous seeds before the seeds are discharged, thereby resulting in two or more closely spaced seeds in the seed furrow (i.e. a "multiple"). Alternatively, if the brush is not properly positioned with respect to the passing seeds (again, whether because of seed size, shape or rotational speed of the seed selection mechanism), or if the brush bristles are too stiff, for example, the brush may actually remove or dislodge all of the seeds from the passing seed selection mechanism resulting in a "skip" or excessive spacing between adjacent seeds in the seed furrow.

Accordingly, it should be appreciated that there is a need for a singulating brush that can be selectively positioned with respect to the passing seed to improve the consistency and accuracy of the seed meter to singulate seeds. Preferably, such an adjustable singulating brush assembly would be sized and/or configured to be interchangeable with conventional singulating brush assemblies used on existing, commercially available seed meters. Also, such an adjustable singulating brush assembly would preferably permit the brush to be adjusted with respect to the seed selection mechanism without having to replace or swap out one brush for another thereby minimizing downtime.

SUMMARY

The present invention is directed to an adjustable singulating brush assembly for a seed meter and method to improve seed singulation of a seed meter. The assembly includes a carrier and a brush selectively adjustably moveable with respect to the carrier.

The method to improve seed singulation of a seed meter includes disposing a selectively adjustable moveable brush along a path of travel of the seed selection mechanism of the seed meter between the meter's seed reservoir and said seed discharge opening and selectively moving the selectively adjustably moveable brush with respect to the path of travel of the seed selection mechanism such that the selected seeds meet the preselected brush position to affect removal of extra seeds from the seed selection mechanism so singular seeds are sequentially discharged through said seed discharge opening.

DESCRIPTION OF THE DRAWINGS

Other objects, advantages, and novel features of the present invention will become apparent from the following detailed description of the invention when considered in conjunction with the accompanying drawings, wherein:

FIG. 5 is an exploded, right-side, perspective view of the adjustable singulating brush assembly of FIG. 1;

FIG. 6 is an exploded, left-side, perspective view of the adjustable singulating brush assembly of FIG. 1;

DETAILED DESCRIPTION

Figure 1:
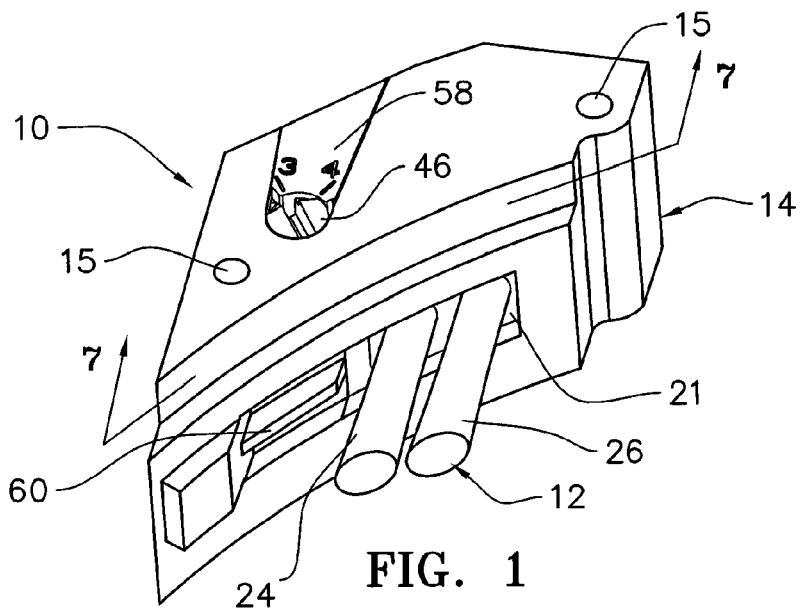
FIG. 1 is a perspective view of the preferred embodiment of the adjustable singulating brush assembly of the present invention.

Referring now to the drawings, wherein like reference numerals designate identical or corresponding parts throughout the several views, FIG. 1 illustrates a perspective view of a preferred embodiment of an adjustable singulating brush assembly 10 of the present invention, which includes a selectively adjustable brush 12 that projects from a carrier 14.

Figure 2:
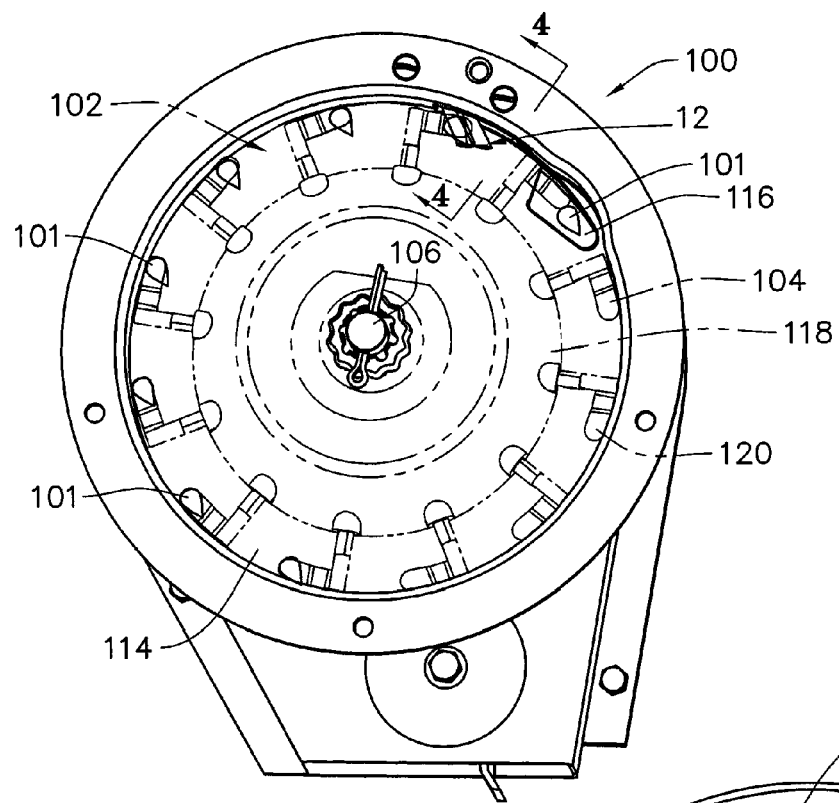
FIG. 2 is a front side perspective view of a conventional finger-pickup seed meter with the front cover removed, exposing the seed selection mechanism (in phantom lines), and illustrating the adjustable singulating brush assembly of FIG. 1 positioned in a preferred location with respect to the seed selection mechanism.
Figure 3:
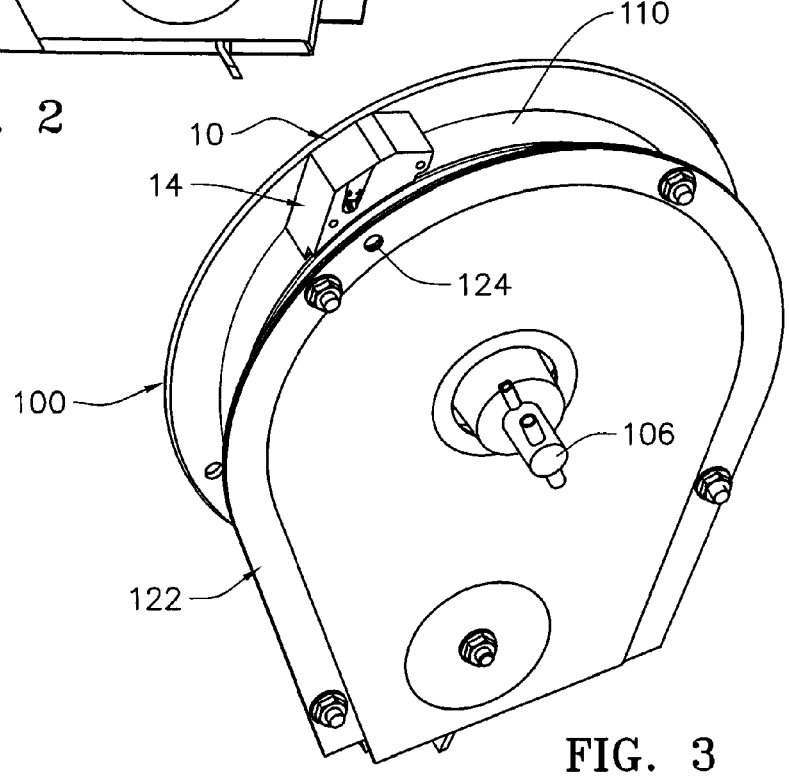
FIG. 3 is a back side perspective view of the finger-pickup seed meter and adjustable singulating brush assembly as illustrated in FIG. 2.

As illustrated in FIG. 2, the adjustable singulating brush assembly 10 is particularly adapted for use with finger-pickup type seed meters such as disclosed in U.S. Pat. No. 3,552,601 to Hansen ("Hansen '601"), which is incorporated herein by reference, and designated generally by reference numeral 100. FIG. 3 illustrates the back-side of the finger-pickup meter 100 of FIG. 2. It should be appreciated that although the preferred embodiment of the brush assembly 10 of the present invention is illustrated in FIGS. 2 and 3 as being particularly adapted for use with finger-pickup meters, an adjustable singulating brush assembly incorporating the structural and functional features of the present invention as claimed herein may be used with any other type of seed meter which utilizes or may benefit from the use of an adjustable singulation brush to remove excess seeds from the seed meter's seed selection mechanism. For example, in addition to finger pickup meters, the adjustable singulating brush assembly of the present invention may be used with cavity-disc meters such as disclosed in U.S. Pat. No. 5,720,233 to Lodico et al. ("Lodico '233"), belt meters such as disclosed in U.S. Pat. No. 5,992,338 to Romans ("Romans '338"), vacuum-disc meters such as disclosed in U.S. Pat. No. 3,990,606 to Gugenhan ("Gugenhan '606") and in U.S. Pat. No. 5,170,909 to Lundie et al. ("Lundie '909") and positive-air meters such as disclosed in U.S. Pat. No. 4,450,979 to Deckler ("Deckler '979").

It should be understood that the term "seed selection mechanism" as used herein refers to the structure of the particular type of seed meter that performs the function of selecting seeds from the seed meter's seed reservoir or seed pool and which then sequentially discharges the selected seeds at regularly spaced intervals. In the case of the finger pickup meter, for example as illustrated in FIGS. 2 and 3 by way of example only, the seed selection mechanism is designated generally by reference numeral 102 and includes a plurality of spring biased fingers 104 which rotate about shaft 106. In the case of the cavity disc meter, for example as disclosed in the Lodico '233 patent, incorporated herein by reference, the seed selection mechanism would comprise the disc or plate having the radially spaced cavities which select and retain the seeds until discharged. In the case of a belt meter, for example as disclosed in the Romans '338 patent, incorporated herein by reference, the seed selection mechanism would comprise the cavity belt. In the case of a vacuum disc meter, for example, as disclosed in the Gugenhan '606 patent or the Lundie '909 patent, each of which is incorporated herein by reference, the seed selection mechanism would comprise the vacuum disc in combination with the vacuum source for entraining the seeds on the disc. In the case of a positive-air meter, for examples, as disclosed in the Deckler '979 patent, incorporated herein by reference, the seed selection mechanism would comprise the seed disc in combination with the positive-air source.

Figure 4:
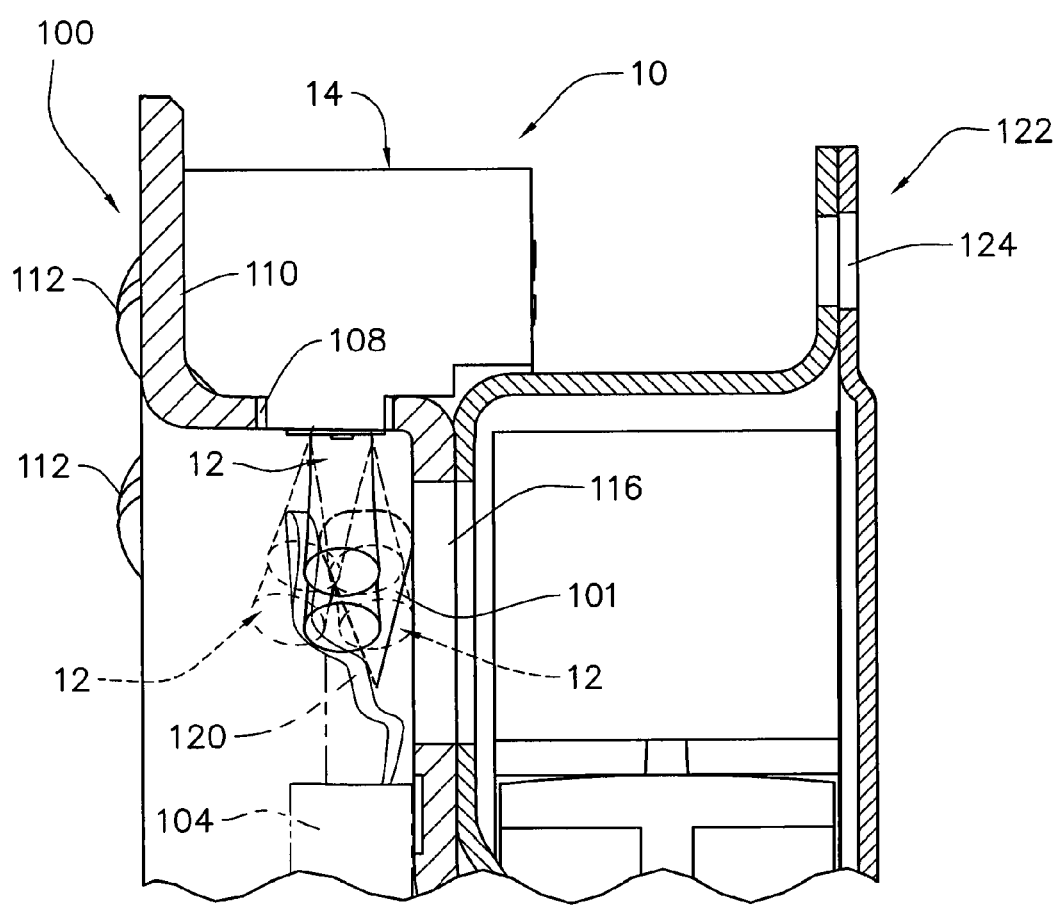
FIG. 4 is an enlarged partial cross-sectional view of the adjustable singulating brush assembly of FIG. 1 as view along lines 4-4 of FIG. 2

As best viewed in FIGS. 3 and 4, in the preferred embodiment, the carrier 14 is removably secured over an aperture 108 and secured to the backing plate 110 (FIG. 4) of the seed meter 100 by threaded fasteners 112 such as screws received within holes 15 in the carrier 14. As best illustrated in FIGS. 2 and 4, the ends of the brush 12 preferably extend into the path of travel of the rotating seed selection mechanism 102 at some point between the seed reservoir 114 and the seed discharge opening 116 such that, in operation as described in detail below, as the captured seeds rotate through the brush 12, any extra or extraneous seeds are removed so only singular seeds reach the seed discharge opening 116.

In operation of the finger pickup meter 100, as each of the spring biased fingers 104 rotates toward the seed reservoir 114, a cam (not shown) below the finger cover 118 causes the finger 104 to lift and slightly pivot, thereby raising the spoon 120 disposed at the end of the finger to move from a closed position against the backing plate 110 to an open position away from or off of the backing plate 110. As the raised or open spoon 120 rotates through the seed pool in the seed reservoir 114, one or more seeds will be captured by the open spoon 120. As the finger leaves the seed reservoir, the spring biased finger 104 rotates past the cam, thereby gradually returning the spoon to the closed position, thereby trapping the captured seeds between the spoon 120 and the backing plate 110. As the finger 104 rotates toward the seed discharge opening 116, the captured seeds within the spoon 120 rotate through the brush 12. Ideally, any extra or extraneous seeds being retained by the spoon 120 are removed by the brush 12 and fall back into the seed pool such that only a singular seed is retained by the spoon 120 for discharge through the seed discharge opening 116 and into the seed belt conveyor housing 122 for dispensing into the seed furrow.

As best illustrated in FIG. 4, which is a detailed cross-sectional view of the meter 100 as viewed along lines 4-4 of FIG. 2, the adjustable brush 12 is preferably selectively moveable with respect to the seed selection mechanism 102 and the passing seeds 101. In the preferred embodiment, the preferred movement is in a direction transverse to the direction of travel of the seed selection mechanism. However, movement in a direction co-planar with the direction of travel of the seed selection mechanism may also be desirable and therefore, the present invention should not be construed as being limited to an adjustable singulating brush selectively movable only in a direction transverse to the direction of travel of the seed selection mechanism.

As previously identified in the BACKGROUND OF THE INVENTION, there are a number of factors that effect the brush's ability to singulate seeds accurately and consistently. These factors include the number of bristles that contact the seed, the length of the bristles, the stiffness of the bristles and the positioning of the bristles. Each of these four factors effecting the brush's performance can also vary depending on seed size, seed shape, and seed population (which effects the speed at which the seeds contact the brush). By being able to incrementally position the brush with respect to the seed selection mechanism and the passing seeds, at least two of the many factors effecting singulation can be more easily controlled, i.e., the number of bristles contacting the seeds, and the positioning of the bristles, thereby improving accuracy and consistency of singulation over a wider range of seed sizes, shapes and seed populations without having to replace or swap out one brush for another thereby minimizing downtime.

For example, when switching from small round seed to larger flat seed, the individual spring loaded fingers may hold the excess seeds more firmly, requiring more aggressive engagement of the brush to remove the excess seed from the fingers 104. Alternatively, when increasing seed population, it may be desirable to lessen the amount of contact between the brush and the passing seed so that the brush does not strip all the seeds from the passing fingers 104 resulting in a seed skip.

It should be appreciated, that the actual size and configuration of the carrier 14 and the orientation, length and size of brush 12, and or the positioning of the assembly 10 with respect to the seed meter's seed selection mechanism may vary depending on the type of seed meter. Accordingly, the present invention should not be construed as being limited to the preferred embodiment as illustrated in the accompanying drawing figures.

As best illustrated in FIGS. 5 and 6, which are exploded, right and left perspective views of the preferred embodiment of the adjustable brush assembly 10 of FIG. 1, the carrier 14 includes a bottom member 16 and a top member 18. The top and bottom members 16 and 18 are preferably molded from durable, weather resistant material such as acrylonitrile-butadiene-styrene (ABS), and are preferably fixedly connected, such as by ultrasonic welding or other suitable means, to retain the internal cooperating components received therein as identified below.

The bottom member 16 defines a chamber 20 which receives the brush 12. The brush 12 comprises a block 22 which preferably supports a pair of first and second tufts of bristles 24, 26. An opening in the bottom of the chamber 20 defines a cavity 21 through which the bristles 24, 26 project. The bristles 24, 26 are preferably secured to the block 22 in a conventional manner, such as by "stapling" (as that term is used in the singulating brush art), or by gluing, tacking, adhering or by any other suitable means readily appreciated by those of ordinary skill in the art. In the preferred embodiment, the brush bristles 24, 26 are preferably nylon, and have a diameter of 0.008 inches. The bristles preferably extend 0.50 inches beyond the carrier 14 and each tuft preferably includes 170 bristles for a total of 340 bristles per brush assembly 10. Naturally, the preferred material, diameter, length and number of bristles per brush may vary depending on the desired brush properties. Accordingly, the foregoing preferred brush properties are provided for reference only and should not be construed as limiting the present invention in any way.

Figures 8, 9:
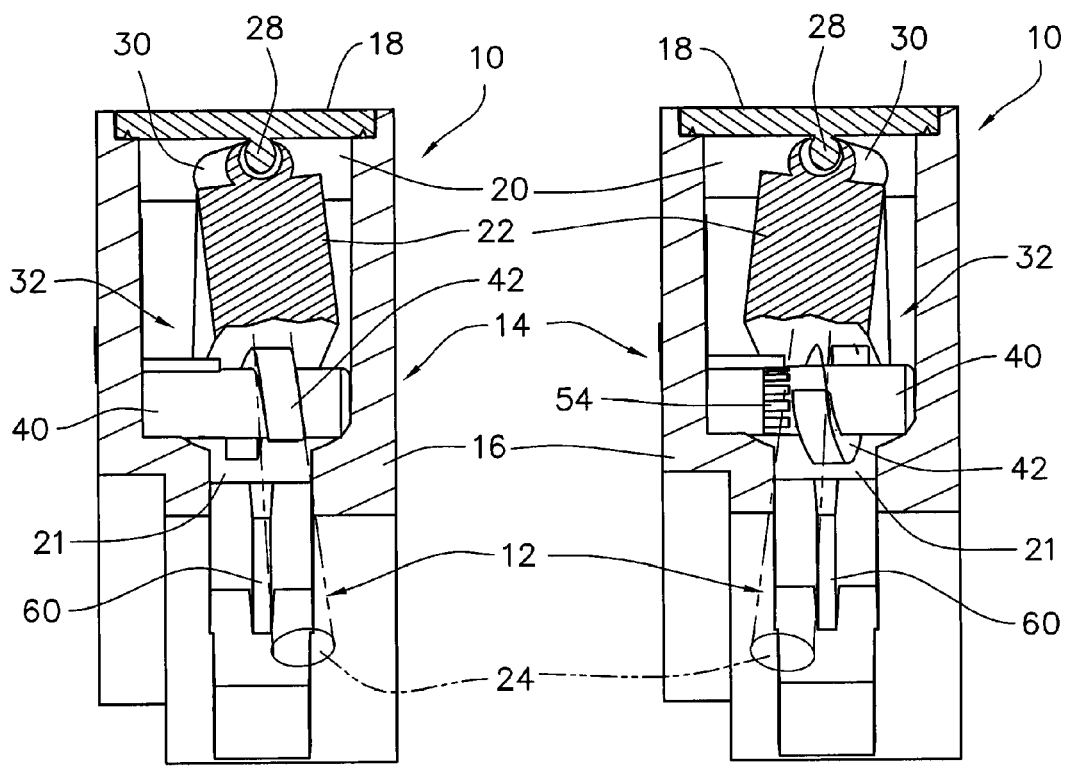
FIG. 8 is a partial cross-sectional view of the adjustable brush of FIG. 1 as viewed along lines 8-8 of FIG. 7 and showing the adjustable brush in one of the adjustable positions with respect to the carrier.
FIG. 9 is a partial cross-sectional view of the adjustable brush of FIG. 1 as viewed along lines 8-8 of FIG. 7 and showing the adjustable brush in another of the adjustable positions with respect to the carrier.

The block 22 is preferably movably disposed within the chamber 20 about a hinge or pivot comprising a bar 28 (FIG. 6) projecting from the underside of the top member 18. A channel 30 projecting from top side of the block 22, preferably frictionally receives the bar 28 such that the block 22 is pivotally movable about the longitudinal axis of the bar 28 thereby allowing the bristles 24, 26 to move from side to side within the cavity 21 as best illustrated in FIGS. 8 and 9.

Figure 7:
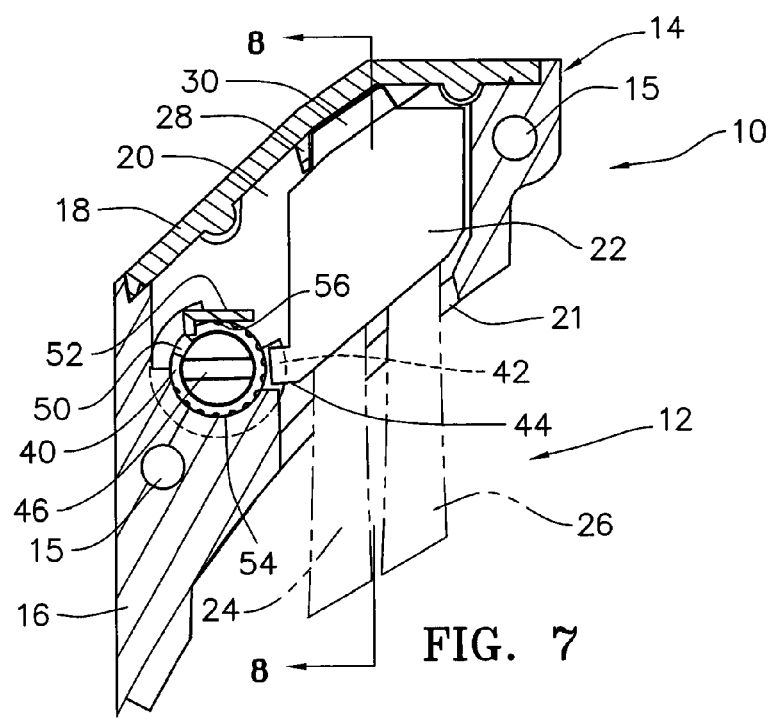
FIG. 7 is a partial cross-sectional view of the adjustable brush of FIG. 1 as viewed along lines 7-7 of FIG. 1.

Referring to FIGS. 5-9, in the preferred embodiment, the movement of the brush 12 with respect to the stationary carrier 14 is preferably accomplished by an adjusting mechanism 32 that engages the block 22 to selectively, adjustably move the block 22 with respect to the carrier 14. In the preferred embodiment, the adjusting mechanism 32 comprises a worm gear 40 rotatable within the chamber 20 about an axis 41. The worm gear 40 preferably includes a helical spine 42 which is received by a slot or groove 44 (FIGS. 5 and 7) in the side of the block 22 disposed transverse to the axis 41. One end 46 (FIG. 5) of the worm gear 40 preferably extends through an aperture 48 (FIG. 5) in a sidewall of the bottom member 16 of the carrier 14. The end 46 of the worm gear 40 is preferably adapted to receive the head of a screwdriver for selective rotation of the worm gear 40 about the axis 41 as illustrated by arrow 47 (FIGS. 6 and 7). The worm gear 40 also preferably includes a rib 50 (FIGS. 5 and 7) parallel to the axis 41 which acts as a "stop" when abutting a detent 52 (FIGS. 6 and 7) projecting from a sidewall of the carrier 14 to prevent further rotation of the worm gear 40 beyond a certain point of rotation in either direction (see FIG. 7). In addition, the worm gear 40 also preferably includes a plurality of circumferentially spaced notches 54 (FIGS. 5-7 and 9), which engage a detent rib 56 (FIG. 6) on the detent 52 (FIG. 7).

The incremental engagement of each of the circumferentially spaced notches 54 with the detent rib 56 as the worm gear 40 rotates, allows incremental rotational positions of the block 22 (and thus the brush bristles 24, 26) as the notches 54 rotate past the detent rib 56. Thus, each "click" of the detent rib 56 as it engages a notch 54 provides preselected adjustment increments by which the orientation of the worm gear 40 and thus brush 12 can be determined. Reference indicia 58 (FIG. 5), such as numbers, hash marks, or the like, are preferably provided on the face of the side wall of the carrier 14 and/or the backing plate (see FIG. 3) adjacent to the end 46 of the worm gear 40 to provide further reference for setting or selecting the position of the worm gear 40 (and thus the brush 12) with respect to the stationary carrier 14. In the preferred embodiment, an aperture 124 (FIGS. 3 and 4) is provided in the flange of the seed belt housing 122 in mating alignment with the end 46 of the worm gear 40 through which the end of a screw driver can be inserted and received by the end 46 of the worm gear 40 for rotational adjustment of the brush 12.

It should be appreciated that the desired position of the brush 12 (as indicated, for example, by the position of the end 46 with respect to reference indicia 58), corresponding to the greatest percentage of singulation for a particular seed variety of a particular seed size and shape and at a desired seed population may be recorded in a table or otherwise charted for future reference. Thus, whenever a farmer is planting that particular seed variety or a similar size and shaped seed at particular seed population, the farmer can look up the proper brush position to achieve the greatest percentage singulation corresponding to that seed variety and seed population.

In reference to FIG. 1, those of skill in the art will recognize that the preferred cavity 21 of the preferred embodiment of the adjustable brush assembly 10 is shorter in length than the cavities found in the carriers of conventional brush assemblies such as disclosed in U.S. Pat. No. 6,273,010 to Luxon (the "Luxon '010 patent"). It was determined that by shortening the cavity 21, there is less area within which seeds can become lodged which can adversely effect the performance of the brush by causing the bristles to become stiffer by limiting their range of motion. However, it was also determined that by shortening the cavity 21 within which the bristles 24, 26 are free to move, the bristles become stiffer for the same reasons as if a seed is lodged in the cavity 21—i.e., the shorter cavity 21 limits the movement of the bristles, such that the bristles are forced to bend closer to their midpoint when pushed against the end of the cavity 21 instead of bending about their base. To overcome this problem, in the preferred embodiment, the singulating brush assembly 10 includes a bristle diverting rib 60 (FIG. 1). The rib 60 diverts a portion of the bristles 24, 26 to each side of the rib 60 thereby lessening the number of bristles 60 directly in line with the passing seed. Thus, the force in direct opposition to the passing seed is substantially the same as if the cavity was larger and the bristles had a greater range of motion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. In combination, a seed meter and an adjustable singulating brush assembly cooperating therewith, the brush assembly, comprising:
   a carrier removably mounted to a housing of a seed selection mechanism of the seed meter, said seed selection mechanism rotating along a path of travel and selecting and sequentially discharging seeds at regular spaced intervals during planting operations;
   a brush having bristles extending from a block, said brush block selectively adjustably pivotable with respect to said path of travel of said seed selection mechanism, whereby said bristles cooperate with said seed selection mechanism to affect removal of extra seeds from said seed selection mechanism.

2. The combination of claim 1 further including an adjusting mechanism cooperating with said brush block.

3. The combination of claim 2 wherein said adjusting mechanism includes a plurality of preselected adjustment increments identifiably selectable from an exterior of said carrier.

4. The combination of claim 3 wherein said adjusting mechanism includes a worm gear engaged with said brush block.

5. The combination of claim 4 wherein said worm gear includes a plurality of circumferentially spaced notches engaged with a detent rib, whereby said brush block is selectively adjustably pivotable with respect to said path of travel of said seed selection mechanism in said preselected adjustment increments.

6. The combination of claim 1 wherein said brush block is disposed within a chamber in said carrier.

7. The combination of claim 6 further including an adjusting mechanism engaged with said brush block.

8. The combination of claim 7 wherein said adjusting mechanism includes a worm gear, said worm gear having a plurality of circumferentially spaced notches engageable with a detent rib, whereby said brush block is selectively adjustably pivotable with respect to said path of travel of said seed selection mechanism in preselected adjustment increments.

9. The combination of claim 1 further including a bristle diverting rib.

10. The combination of claim 1 wherein said carrier is secured to said housing of the seed selection mechanism, said housing defining a seed reservoir and having a seed discharge opening.

11. The combination of claim 10 wherein said seed selection mechanism is a finger-type seed selection mechanism having a plurality of spring-biased fingers rotating in said housing along said path of travel, whereby said spring-biased fingers select seeds from said seed reservoir and sequentially discharge said selected seeds at spaced intervals through said discharge opening; and further wherein at least a portion of said brush bristles are disposed along said path of travel between said seed reservoir and said discharge opening.

12. The combination of claim 11 further including an adjusting mechanism cooperating with said brush block, whereby said brush bristles are selectively moveable with respect to said path of travel of said spring-biased fingers.

13. The combination of claim 12 wherein said brush bristles are selectively moveable in a direction transverse to said path of travel of said spring-biased fingers.

14. The combination of claim 12 wherein said brush bristles are selectively moveable in a direction substantially co-planar with said path of travel of said spring-biased fingers.

15. The combination of claim 12 wherein said adjusting mechanism includes a plurality of preselected adjustment increments identifiably selectable from an exterior of said housing.

16. The combination of claim 15 wherein said adjusting mechanism includes a worm gear engaged with said brush block.

17. The combination of claim 16 wherein said adjusting mechanism further includes a plurality of spaced notches engageable with a detent rib, whereby said brush block is selectively adjustably moveable with respect to said path of travel of said spring-biased fingers in said preselected adjustment increments.

18. The combination of claim 11 wherein said brush block is disposed within a chamber in said carrier.

19. The combination of claim 18 further including an adjusting mechanism gear engaged with said brush block.

20. The combination of claim 19 wherein said adjusting mechanism includes a worm gear, said worm gear having a plurality of circumferentially spaced notches engaged with a detent rib, whereby said brush block is selectively adjustably moveable with respect to said path of travel of said spring-biased fingers in preselected adjustment increments.

21. The combination of claim 20 wherein said carrier includes a bristle diverting rib to divert a portion of said bristles to either side of said rib as said spring-biased fingers pass said bristles.

* * * * *